INVENTOR.
Charles S. Bailey
BY George E. Johnson
ATTORNEY 3,241,760
LOW WAX PRESSURE THERMOSTAT
Charles S. Bailey, Lockport, N.Y., assignor to General Motors Corporation, Detroit, Mich., a corporation of Delaware
Filed June 9, 1964, Ser. No. 373,690
6 Claims. (Cl. 236—34)

This invention relates to thermostats and particularly to thermostats of the type useful in controlling temperatures of internal combustion engine cooling systems.

It is customary to control the flow of liquid engine coolant from the engine jacket to a radiator by means of a thermostat which opens to permit the flow only when the engine temperature has exceeded a predetermined value. Heretofore, such thermostats often utilized a thermosensitive wax composition whereby automatic operation is achieved. Such a thermostat is disclosed in United States Patent 2,873,633, granted February 17, 1959, in the name of Howard F. May. That particular patent shows a butterfly type thermostat but poppet type valve thermostats and sleeve type thermostats are also conventional but all of these which use a wax composition to actuate them find it necessary to employ a rather high wax pressure in order to bring about their operation.

An object of the present invention is to provide a thermostat which will operate without being affected by pump pressure and at the same time will employ a wax composition effective to operate the valve under low pressure of that composition thereby minimizing problems of leakage and calibration often had with high pressure wax thermostats.

A feature of the present invention is a sleeve type thermostat in which a central member bears two walls determining, with the sleeve employed, a space so proportioned as to make a wax therein effective under low pressure to operate the thermostat.

This and other important features of the invention will now be described in detail in the specification and then pointed out more particularly in the appended claims.

Figure 1:
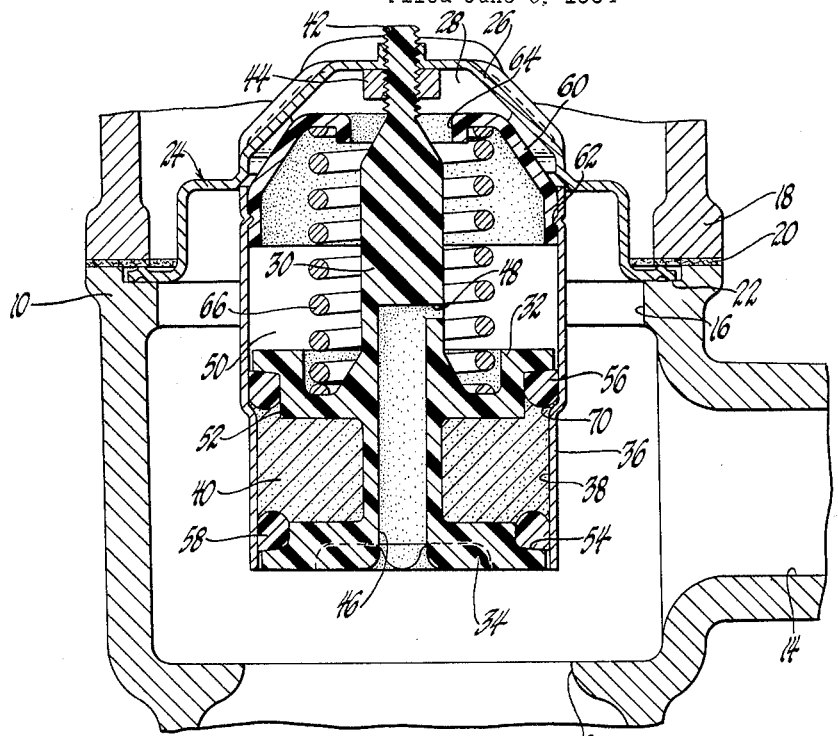
FIGURE 1 is a view of conduit portions serving an internal combustion engine with a thermostat installed therein as one embodiment of the present invention, the conduits and thermostat being shown in section and the thermostat being closed.

The conduit portion 10 in FIGURE 1 is depicted as showing an opening 12 for the introduction of engine coolant coming from the jacket and water pump of an engine. The conduit portion 10 also has a side opening 14 for bypassing the engine coolant around the conventional automobile radiator and back to the engine block. The portion 10 also is provided with a discharge opening 16 in registry with a conduit portion 18 provided for conducting the engine coolant to the top of the radiator.

Interposed between the conduit portions 10 and 18 are a sealing gasket 20 and the flange 22 of a circular frame indicated generally at 24. This frame has a bridge structure 26 separating two discharge openings 28.

Depending from the center of the bridge structure 26 is a plastic central member 30 having two integral and circular walls 32 and 34. These two walls are spaced from each other along the length of the central member 30 and cooperate with a metal sleeve 36 in defining a space 38 for a thermosensitive wax composition 40. The top of the central member 30 is threaded as at 42 for attachment to the bridge structure 26 and suitable calibration as by adjustment of a nut 44. The lower central half of the central number 30 is apertured as at 46 to give communication to a restricted vent 48 leading to a space 50 above the wall 32. The opposing faces of the two walls 32 and 34 have their peripheries recessed as at 52 and 54 to retain sealing O-rings 56 and 58 respectively. These O-rings form a fluid-tight seal between the walls 32 and 34 on the one hand and the interior surface of the sleeve 36 on the other.

A partially frusto-conical plastic spring retainer 60 is held within the upper end of the sleeve 36 by means of a detent arrangement 62 permitting quick assembly and this retainer has a central opening 64 of sufficient size to clear the diameter of the upper half of the central member 30. A spring 66 is confined between the spring retainer 60 and the circular wall 32 and the proportions of the thermostat parts are such that the spring 66 constantly urges the sleeve 36 toward a position of seating engagement with the frame 24 to close off the discharge openings 28.

Assuming that the engine coolant is cold as it enters through the opening 12, the thermostat parts will be positioned as shown in FIGURE 1 and the coolant will be discharged by way of the bypass opening 14.

Figure 2:
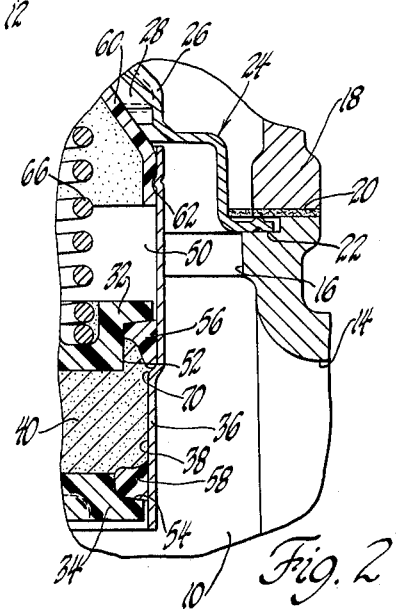
FIGURE 2 is a sectional view of a portion of the elements shown in FIGURE 1 but with the thermostat being illustrated in an open position.
Figure 3:
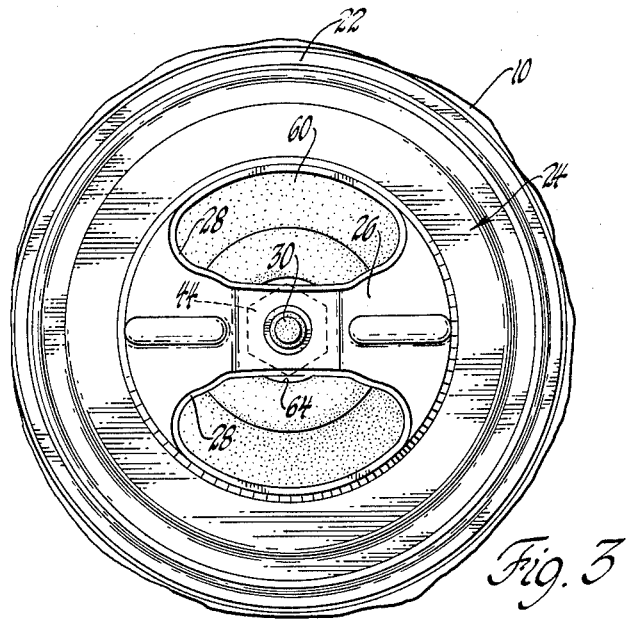
FIGURE 3 is a plan view of the structure shown in FIGURE 1 with the upper conduit portion and sealing gasket removed.

When the engine becomes sufficiently warm to achieve operating efficiency, the wax composition 40 will be heated by the engine coolant and will tend to expand. Thus expansion will generate a pressure on the annular shoulder 70 within the sleeve 36 and force the latter downwardly to open the thermostat as shown in FIGURE 2. When the engine is stopped and again becomes cold, the thermostat will again close because of the action of the spring 66.

An important feature of the present invention is the vent 48. It should be noted that the thermostat will be quickly responsive to changes in temperature because the wax composition 40 will not only be surrounded by the engine coolant but also the engine coolant will be passing through the center of the wax composition. It is also to be noted that the space 38 for the wax composition 40 is large and the area of the shoulder 70 may be large and, therefore, the pressure necessary to bring about opening of the valve or sleeve may be low because of the large amount of wax and the size of the shoulder 70 which may be used as compared with previous devices and this eliminates the need for extreme care in calibrating. All that is necessary in calibrating is that the central member 30 be screwed up or down with relation to the bridge structure 26 and fixed in juxtaposition by means of the nut 44. Another advantage of the instant construction is its simplicity and its special structure which is conducive to volume production. The central member 30 may be made and is preferably made, but not necessarily so, of plastic and as such the two walls 32 and 34 may be integral therewith. Advantageously, the spring retaining means 60 is preferably also made of plastic and this makes it possible quickly to join the sleeve 36 to the spring retainer by the mere detent provision 62 as described above.

I claim:

1. A thermostat for controlling the flow of fluid in a conduit, said thermostat comprising a frame adapted to be mounted in said conduit and having a discharge opening therein, a central member fixed to said frame and having two spaced sealing walls, a sleeve slidable on said walls with one end adapted to seat on said frame to close off said discharge opening, spring retaining means on said sleeve, spring means acting between one of said walls and said retaining means urging said sleeve toward its closed position, an interior annular shoulder on said sleeve between said walls and facing said one wall, and an expansible thermo-sensitive wax composition filling a space within said sleeve between said walls and contacting said annular shoulder.

2. A thermostat comprising a circular frame having an opening therein and adapted to be mounted in a conduit, a central member fixed to said frame at one side of said opening, two circular and spaced sealing walls coaxially supported by said central member, a sleeve slidable on said walls with one end adapted to seat on said frame around said opening and central member, spring retaining means on said sleeve, spring means acting between one of said walls and said retaining means urging said sleeve toward its seated position, an interior shoulder on said sleeve between said walls and facing said one wall, an expansible thermo-sensitive wax composition filling a space determined by said walls and sleeve, and means forming a fluid-tight seal between said sleeve and each of said walls to confine said composition.

3. A thermostat such as set forth in claim 2, said central member having a vent bypassing said sealing walls.

4. A thermostat such as set forth in claim 2, said central member and said walls being integral and of plastic material, and said sleeve being of sheet metal.

5. A thermostat comprising a circular frame having at least one opening therein and adapted to be mounted transversely to a conduit, a plastic central member fixed to said frame, two circular and spaced sealing walls supported by said central member and integral therewith, a sleeve slidable on said walls with one end adapted to seat on said frame around said central member and said opening, spring retaining means on said sleeve, spring means acting between one of said walls and said retaining means urging said sleeve toward its seated position on said frame, an interior shoulder on said sleeve and facing said one wall, an expansible thermosensitive wax composition filling a space determined by said walls and sleeve and contacting said shoulder, means forming a fluid-tight seal between said sleeve and each of said walls to confine said composition, and said frame, central member, sealing walls and sleeve being coaxial.

6. A thermostat such as set forth in claim 5, said spring retaining means being of plastic and resiliently retained on said sleeve.

References Cited by the Examiner

UNITED STATES PATENTS

| | | | |
|---|---|---|---|
| 2,806,375 | 9/1957 | Wood | 73—369.3 |
| 2,941,404 | 6/1960 | Woods | 73—369.3 |
| 3,189,276 | 6/1965 | Bailey | 236—34 |

EDWARD J. MICHAEL, *Primary Examiner.*